Dec. 4, 1928.
W. H. NOELTING
1,693,657
BALL BEARING SOCKET AND FRICTION BAND STEM
Filed May 2, 1925
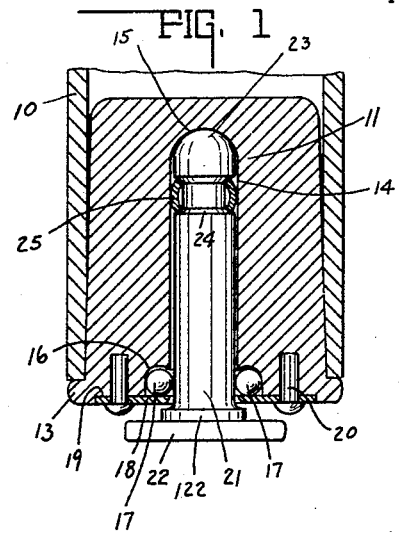
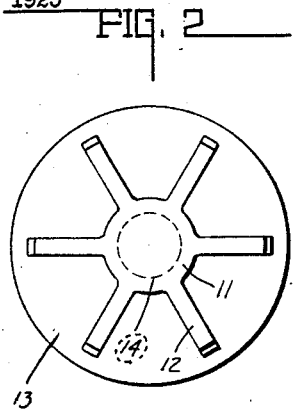
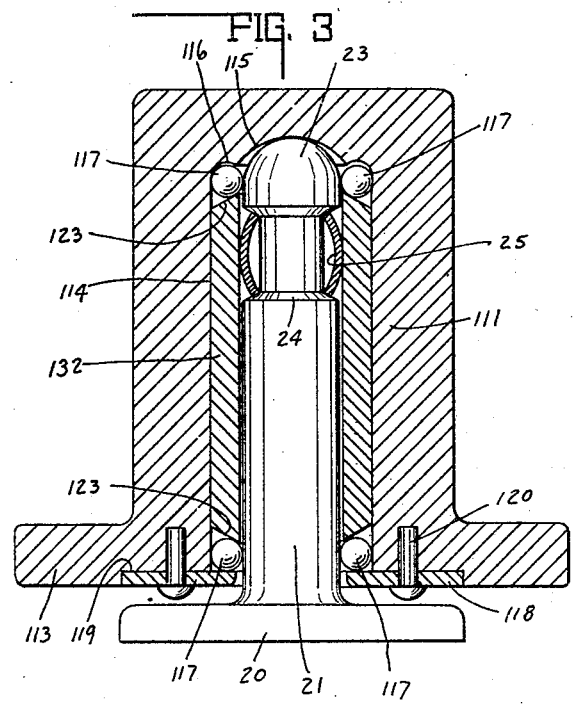
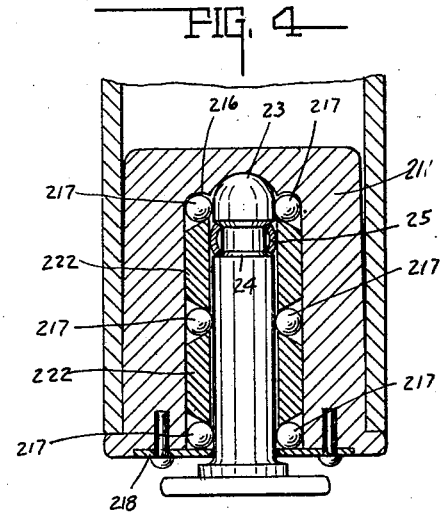
INVENTOR.
WILLIAM H. NOELTING.
BY
*[signature]*
ATTORNEYS.

Patented Dec. 4, 1928.

1,693,657

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

BALL-BEARING SOCKET AND FRICTION BAND STEM.

Application filed May 2, 1925. Serial No. 27,415.

This invention relates to a socket for tubular legs or the like wherein cocking of the pintle is substantially eliminated, and furthermore wherein a detachable pintle is yieldingly retained in a socket opening.

The chief object of the invention is to provide a caster socket and caster stem and so associate the same together that lateral play of the stem within the socket will be substantially eliminated, yet the socket and stem will be frictionally retained together.

The chief feature of the invention consists in the provision of a metallic socket body having an opening therein, which body is suitably formed to receive one or more anti-friction laterally engaging elements adapted to receive a caster stem and prevent material lateral movement or side play of the stem within the socket and which stem is retained in the socket through the medium of an annular yielding member.

The full nature of the invention will be understood from the accompanying drawings and the following description and claims:

In the drawings Fig. 1 is a central sectional view of a tubular leg including a caster socket and the stem and retaining member associated therewith. Fig. 2 is a top plan view of the form of the invention shown in Fig. 1. Fig. 3 is an enlarged sectional view of a second and modified form of the invention, the tubular leg being omitted. Fig. 4 is similar to Fig. 1 and of a further modified form of the invention.

In the drawings 10 indicates a tubular leg and positioned within said leg is a metallic socket member 11. Said socket member 11 includes a plurality of wings 12 which wings as shown clearly in Fig. 2, have an inclined or sloping face for forming a wedge. Said socket is adapted to be driven into the tubular leg and be frictionally retained thereby, the longitudinal movement of the socket in the leg being limited by the flange portion 13. The body portion 11 includes a central opening 14 which is herein shown closed at its upper end by a spherical portion or head 15. Adjacent the lower end of the opening and communicating therewith is a chamber or enlargement 16 in which there is positioned a plurality of anti-friction elements or balls 17, said balls being retained in said chamber by a centrally apertured plate 18, the latter being seatable in a recess 19 formed in the bottom of the socket or flange 13. The plate is suitably secured to the socket in any desirable manner as by the rivets or escutcheon pins. The caster includes a plate or yoke portion 22 supported by a stem 21 having the enlargement 122 immediately adjacent thereto. The stem 21 is substantially the diameter of the opening 14 and very nearly occupies the entire opening. The stem 21 includes a semispherical head 23 at its upper end which engages the spherical headed portion of the socket 15. Herein, and immediately adjacent the spherical headed portion of the stem the same is provided with a shallow groove 24 which receives an annular band 25 of yielding material. Preferably such a band is of spring metal and said band is provided with one parting and is outwardly expansible. The band is thus anchored to the stem but is entirely receivable by the channel 24 or groove when the stem is being inserted into the socket opening. Following insertion the band expands into frictional engagement with the wall of the opening and yieldingly retains the stem therein. The stem is engaged laterally adjacent its lower end by the anti-friction elements 17 and cocking of the pintle is prevented, and furthermore, frictional resistance at this point of the socket is also substantially eliminated.

In Fig. 3 there is illustrated a modified form of the invention. In this form of the invention the socket includes a body portion 111 which is provided with a central opening 114 and at its base includes a flanged portion 113, the latter being provided with the recess 119. The head of the opening 114 is curved as indicated at 115 and adjacent thereto in this form of the invention is a portion of a raceway 116 adapted to receive an annular series of anti-friction elements, such as the balls 117. A sleeve 132 includes the beveled end 123 and said beveled end engages the balls 117 and forms a retainer therefor. The balls have lateral engagement with the stem 21 and prevent cocking of the head of the stem in the head of the socket, the latter having a considerable greater radius of curvature than the head of the stem. The sleeve 132 at its lower end is provided with a similar beveled edge or face 123 and a similar series of balls 117 is retained thereby and by the ball retaining plate 118 seatable in the recess 119 and secured therein by the means 120 as shown. In this form of the invention lateral play at the head or foot of the socket opening is substantially eliminated. This form of construction permits the stem to be of the full fit character, that is it substantially occupies the entire socket opening with the exception of the shallow groove which is occupied by the friction band 25.

In Fig. 4 a further modified form of the invention is illustrated, and in this form of the invention the swiveling characteristics of the stem are further improved by reason of the addition of an intermediate series of balls 217 retained in position by a pair of sleeves 222, the upper sleeve being associated with the upper series of balls 217 at its upper end and the lower sleeve being associated with the lower series of balls 217 at its lower end. The upper series of balls is maintained in position by the suitable formation of the socket as at 216. The lower series of balls is retained in position by the plate 218. The stem and friction band are substantially the same as that heretofore illustrated.

Herein, particularly in Figs. 1 and 4, the socket member is shown associated with a tubular leg and is shown having a frictional engagement therewith. It is to be understood, however, that the socket may be otherwise formed so far as its shape or conformation is concerned, so that it may be readily secured to other types of legs. In that event it may be desirable to rivet the socket member to the legs or to bolt the same thereon.

The invention claimed is:

1. A caster and socket for legs including a leg supporting body adapted for relatively permanent mounting upon a leg and having a cylindrical opening therein, a lateral series of anti-friction elements coaxial with said opening, an apertured retainer for said anti-friction elements secured to the body, a caster including a cylindrical stem receivable by the retainer aperture and body opening and laterally engageable by the anti-friction elements and detachably associated with the body, and an annular resilient member carried by the stem and frictionally and peripherally engaging the adjacent wall for retaining the stem in the opening but permitting forcible detachment.

2. A caster and socket for legs including a leg supporting body adapted for relatively permanent mounting upon a leg and having a cylindrical opening therein, a plurality of lateral series of anti-friction elements coaxial with said opening, an apertured retainer for said anti-friction elements detachably secured to the body, a caster including a cylindrical stem receivable by the aperture and opening and laterally engageable by the anti-friction elements and detachably associated with the body, an annular resilient member carried by the stem and frictionally and peripherally engaging the adjacent wall for retaining the stem in the opening, but permitting forcible detachment, and detachable spacing sleeve means interposed between each pair of adjacent series of anti-friction elements for retaining the same in position.

3. The combination of a tubular leg, a body having sloping exterior sides and a laterally projecting flange, said body being frictionally and wedgingly receivable by said leg and being limited in movement thereon by said flange, said body having a cylindrical opening terminating in a curved head, said opening being enlarged adjacent the mouth thereof, an annular series of anti-friction elements receivable by said body, a plate seatable in said enlargement and retaining said anti-friction elements in said opening, and a spherical headed stem substantially occupying the opening and having lateral engagement with said anti-friction elements and axial engagement with the body head.

4. A device of the character defined by claim 10, characterized by the addition of another annular series of anti-friction elements, the same being positionable adjacent the head of the socket for laterally engaging the stem adjacent the head thereof, and sleeve means interposed between said series of anti-friction elements for maintaining the same in spaced relation and assuring axial alignment of the stem and body heads.

5. The combination of a leg supporting and caster supported body having a cylindrical opening therein which terminates in a closed end, a plurality of annular series of anti-friction elements receivable by the body opening, means for closing the opposite end of the body opening for retaining the anti-friction elements against longitudinal removal, sleeve means interposed between said series of anti-friction elements for maintaining the same in spaced relation, and a cylindrical caster stem receivable by the body opening and substantially occupying the same and laterally and peripherally engageable by said plurality of series of anti-friction elements, the closed end of said body and the adjacent end of the stem being fashioned for providing a substantially axial line or point to point aligned and relatively anti-frictional contact when loaded and maintained in said alignment when loaded by the plurality of series of anti-friction elements.

In witness whereof, I have hereunto affixed my signature.

WILLIAM H. NOELTING.